United States Patent
Witt (10) Patent No.: US 6,219,784 B1
(45) Date of Patent: Apr. 17, 2001

(54) PROCESSOR WITH N ADDERS FOR PARALLEL TARGET ADDRESSES CALCULATION

(75) Inventor: David B. Witt, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/193,086

(22) Filed: Nov. 16, 1998

Related U.S. Application Data (60) Provisional application No. 60/065,878, filed on Nov. 17, 1997.

(51) Int. Cl.[7] .............................. G06F 15/00; G06F 7/38; G06F 9/00; G06F 9/44
(52) U.S. Cl. ........................ 712/235; 712/235; 712/239
(58) Field of Search .............................. 711/125; 712/23, 712/218, 219, 234, 235, 236, 215, 239, 240, 9, 204, 205, 206, 233

(56) References Cited

U.S. PATENT DOCUMENTS

| | | | |
|---|---|---|---|
| 5,142,634 | | 8/1992 | Fite et al. . |
| 5,434,985 | * | 7/1995 | Emma et al. .................. 712/240 |
| 5,758,142 | | 5/1998 | McFarling et al. .............. 712/239 |
| 5,799,180 | * | 5/1999 | Shiell et al. ..................... 712/234 |
| 5,826,096 | * | 10/1998 | Baxter ............................... 712/24 |
| 5,903,750 | * | 5/1999 | Yeh et al. ........................ 712/236 |
| 5,918,044 | * | 6/1999 | Levitan et al. ................. 712/235 |
| 6,073,230 | * | 6/2000 | Pickett et al. ................... 712/205 |
| 6,108,774 | * | 8/2000 | Muthusamy ..................... 712/240 |
| 6,128,720 | * | 10/2000 | Pechanek et al. ................. 712/20 |

\* cited by examiner

*Primary Examiner*—Thomas Lee
*Assistant Examiner*—Chun Cao
(74) *Attorney, Agent, or Firm*—Conley, Rose & Tayon, PC; Lawrence J. Merkel (57) ABSTRACT

A processor is configured to detect a branch instruction have a forward branch target address within a predetermined range of the branch fetch address of the branch instruction. If the branch instruction is predicted taken, instead of canceling subsequent instructions and fetching the branch target address, the processor allows sequential fetching to continue and selectively cancels the sequential instructions which are not part of the predicted instruction sequence (i.e. the instructions between the predicted taken branch instruction and the target instruction identified by the forward branch target address). Instructions within the predicted instruction sequence which may already have been fetched prior to predicting the branch instruction taken may be retained within the pipeline of the processor, and yet subsequent instructions may be fetched.

30 Claims, 6 Drawing Sheets

PROCESSOR WITH N ADDERS FOR PARALLEL TARGET ADDRESSES CALCULATION

This application claims priority to provisional application 60/065,878 filed Nov. 17, 1997.

BACKGROUND OF THE INVENTION

1. Field of the Invention

The present invention relates to the art of microprocessors and, more particularly, to circuits and methods within the microprocessor for generating target addresses.

2. Description of the Related Art

Superscalar processors attempt to achieve high performance by dispatching and executing multiple instructions per clock cycle, and by operating at the shortest possible clock cycle time. To the extent a given processor is successful at dispatching and/or executing multiple instructions per clock cycle, high performance may be realized. In order to increase the average number of instructions dispatched per clock cycle, processor designers have been designing superscalar processors that employ wider issue rates. A "wide issue" superscalar processor is capable of dispatching a larger number of instructions per clock cycle when compared to a "narrow issue" superscalar processor. During clock cycles in which a number of dispatchable instructions is greater than the narrow issue processor can handle, the wide issue processor may dispatch more instructions, thereby achieving a greater average number of instructions dispatched per clock cycle.

To support wide issue rates, the superscalar processor should be capable of fetching a large number of instructions per clock cycle (on the average). A processor capable of fetching a large number of instructions per clock cycle will be referred to herein as having a "high fetch bandwidth." If the superscalar processor is unable to achieve a high fetch bandwidth, then the processor may be unable utilize wide issue hardware if contained therein.

Several factors may impact the ability of a particular processor to achieve a high fetch bandwidth. For example, many code sequences have a high frequency of branch instructions, which may redirect the fetching of subsequent instructions within that code sequence to a target address specified by the branch instruction. Accordingly, the processor may identify the target address after fetching the branch instruction. The next instructions within the code sequence may be fetched using the branch target address. Processors attempt to minimize the impact of conditional branch instructions on the fetch bandwidth by employing highly accurate branch prediction mechanisms and by generating the subsequent fetch address (either target or sequential) as rapidly as possible.

As used herein, a branch instruction is an instruction that specifies, either directly or indirectly, the address of the next instruction to be fetched. The address may be the sequential address identifying the instruction immediately subsequent to the branch instruction within memory, or a target address identifying a different instruction stored elsewhere in memory. Unconditional branch instructions always select the target address, while conditional branch instructions select either the sequential address or the target address based upon a condition specified by the branch instruction. For example, the processor may include a set of condition codes which indicate the results of executing previous instructions, and the branch instruction may test one or more of the condition codes to determine if the branch selects the sequential address or the target address. A branch instruction is referred to as taken if the target address is selected via execution of the branch instruction, and not taken if the sequential address is selected. Similarly, if a conditional branch instruction is predicted via a branch prediction mechanism, the branch instruction is referred to as predicted taken if target address is predicted to be selected upon execution of the branch instruction, and is referred to as predicted not taken if the sequential address is predicted to be selected upon execution of the branch instruction.

Unfortunately, even if highly accurate branch prediction mechanisms are used to predict branch instructions, fetch bandwidth may still suffer. Typically, a run of instructions is fetched by the processor, and a first branch instruction within the run of instructions is detected. Fetched instructions subsequent to the first branch instruction are discarded if the branch instruction is predicted taken, and the target address is fetched. Accordingly, the number of instructions fetched during clock cycle in which a branch instruction is fetched and predicted taken is limited to the number of instructions prior to and including the first branch instruction within the run of instructions being fetched. Since branch instructions are frequent in many code sequences, this limitation may be significant. Performance of the processor may be decreased if the limitation to the fetch bandwidth leads to a lack of instructions being available for dispatch.

SUMMARY OF THE INVENTION

The present invention provides a circuit and method for generating a pair of target addresses in parallel in response to detecting a pair of conditional branch instructions within a run of instructions. In one embodiment, the circuit of the present invention is embodied within a microprocessor having an instruction run storage device, a branch scanner circuit, and a target address generation circuit. The instruction run storage device stores a fetched run of instructions which includes a plurality of instruction bytes. The branch scanner circuit is coupled to the instruction run storage. The branch scanner circuit operates to identify a pair of conditional branch instructions (i.e., first and second conditional branch instructions) within the run of instructions. The target address generation circuit is coupled to the branch scanner circuit. The target address generation circuit generates a first target address and a second target address in parallel and in response to the branch scanner circuit identifying the first and second conditional branch instructions. The first and second target addresses correspond to first and second target instructions, respectively, which can be executed in parallel if the first and second conditional branch instructions are predicted as taken.

The target address generation circuit further includes a multi-bit signal generator, a first target address generator, and a second target address generator. The multi-bit signal generator operates to generate multi-bit signals. The first target address generator generates the first target address, and the second target address generator generates the second target address. The multi-bit signal generator is coupled to receive N bytes of the run of instructions stored within the instruction run storage device. The multi-bit generator generates each multi-bit signal as a function of one of the N instruction bytes.

The target address generation circuit also includes an instruction byte partial address generator. This instruction byte partial address generator is coupled to receive at least a portion of a fetch address corresponding to the run of instructions in the instruction run storage device. The instruction byte partial address generator operates to generate instruction byte partial addresses corresponding to the N bytes stored within the instruction line storage device. Each of the N instruction partial byte addresses is generated as a function of the fetch address portion.

In one embodiment, the multi-bit generator further includes N adders, a first selection device, and a second selection device. The N adders generate N multi-bit signals by adding corresponding bytes of the run of instructions stored in the instruction run storage device and the instruction byte partial addresses. The first selection device has N inputs, an output, and a selection input. Each of the N inputs receives an output of one of the N adders. The selection input receives a first selection signal from the branch scanner circuit. The first selection device operates to select for output a first multi-bit signal provided by one of the N adders in response to receiving the first signal. The second selection device has N inputs, an output, and a selection input. Each of the N inputs receives one of the N multi-bit signals from the N adders. The selection input of the second selection device receives a second selection signal from the branch scanner circuit. The second selection device operates to select for output a second multi-bit signal from among the N multi-bit signals provided by the N adders in response to receiving the second selection signal.

In one embodiment, the first target address generator includes a first circuit for incrementing the upper bits of the fetch address, a second circuit for decrementing the upper bits of the fetch address, a selection circuit with inputs coupled to receive the upper bits of the fetch address and the outputs of the first and second circuits. The selection circuit is configured to select for output the upper bits of the fetch address, the output of the first circuit, or the output of the second circuit. The output of the selection circuit is concatenated with the first multi-bit signal provided by the first selection device thereby forming the first target address.

BRIEF DESCRIPTION OF THE DRAWINGS

Other objects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
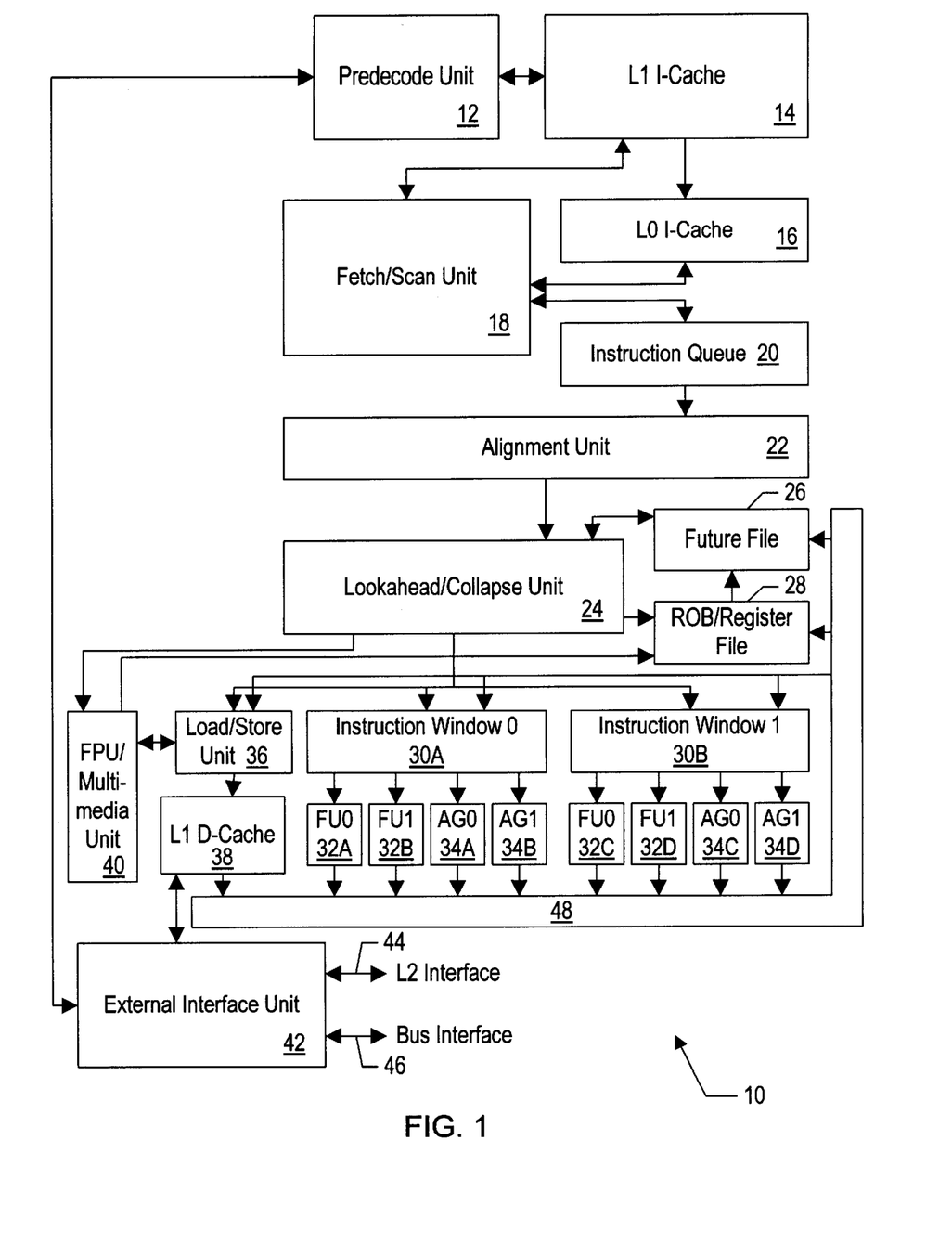
FIG. 1 is a block diagram of one embodiment of a processor employing the present invention.

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a lookahead/collapse unit 24, a future file 26, a reorder buffer/register file 28, a first instruction window 30A, a second instruction window 30B, a plurality of functional units 32A, 32B, 32C, and 32D, a plurality of address generation units 34A, 34B, 34C, and 34D, a load/store unit 36, an L1 D-cache 38, an FPU/multimedia unit 40, and an external interface unit 42. Elements referred to herein by a particular reference number followed by various letters will be collectively referred to using the reference number alone. For example, functional units 32A, 32B, 32C, and 32D will be collectively referred to as functional units 32.

In the embodiment of FIG. 1, external interface unit 42 is coupled to predecode unit 12, L1 D-cache 38, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is further coupled to lookahead/collapse unit 24. Lookahead/collapse unit 24 is further coupled to future file 26, reorder buffer/register file 28, load/store unit 36, first instruction window 30A, second instruction window 30B, and FPU/multimedia unit 40. FPU/multimedia unit 40 is coupled to load/store unit 36 and to reorder buffer/register file 28. Load/store unit 36 is coupled to L1 D-cache 38. FIG. rst instruction window 30A is coupled to functional units 32A–32B and to address generation units 34A–34B. Similarly, second instruction window 30B is coupled to functional units 32C–32D and address generation units 34C–34D. Each of L1 D-cache 38, functional units 32, and address generation units 34 are coupled to a plurality of result buses 48 which are further coupled to load/store unit 36, first instruction window 30A, second instruction window 30B, reorder buffer/register file 28, and future file 26.

Generally speaking, processor 10 is configured to fetch a run of instructions from L0 I-cache 16. Fetch/scan unit 18 is configured to scan the fetched run of instructions in order to detect one or more conditional branch instructions included therein, and is further configured to predict the detected conditional branch instructions. If a detected branch instruction is predicted taken and has a corresponding forward branch target address, fetch/scan unit 18 is configured to selectively cancel one or more of the instructions within the fetched run subsequent to the predicted branch instruction while retaining other instructions subsequent to the predicted branch instruction. More particularly, if the forward branch target address is within a predetermined range from the branch fetch address of the corresponding branch instruction, the instructions between the predicted branch instruction and forward branch instruction stored at the forward branch target address are cancelled while the subsequent instruction and any succeeding instructions are retained.

Advantageously, the achievable fetch bandwidth may be improved by retaining forward target instructions that are fetched concurrently with the branch instruction. Instead of discarding the target instructions which have already been fetched and fetching those target instructions again during a subsequent fetch using the forward branch target address, the target instructions are retained and instructions sequential to the previously fetched target instructions are fetched.

In one embodiment, fetch/scan unit 18 is configured to detect and predict up to two branch instructions within a run of instructions from L0 I-cache 16 during a clock cycle. If the first detected branch instruction is predicted taken and has a forward branch target address, instructions are selectively cancelled as described above. Fetch/scan unit 18 then determines if the second detected branch instruction is still within the run of instructions (i.e. the second branch instruction was not cancelled). If the second detected branch instruction was not cancelled, is predicted taken, and has a forward branch target address, instructions subsequent to the second detected branch instruction are selectively cancelled and retained in a manner similar to the processing of the first detected branch instruction. Advantageously, up to two branch instructions may be predicted per fetch, and fetch bandwidth may be even further increased.

As used herein, the term "forward branch target address" refers to a branch target address which is numerically greater than the fetch address of the branch instruction specifying the branch target address. The fetch address of the branch instruction (or "branch fetch address") is the address at which the branch instruction is stored. Furthermore, the term canceling instructions refers to invalidating the instructions within the pipeline subsequent to fetching the instructions. For example, the instructions may be invalidated within instruction queue 20. The term "squashing instructions" may also be used herein to refer to canceling the instructions. An instruction is referred to as being between a branch instruction and a subsequent target instruction if the instruction is stored at a fetch address which is numerically greater than the branch fetch address and numerically less then the branch target address specified by the branch instruction. Additionally, a forward target address is "within a predetermined range" of the corresponding branch fetch address if the difference between the branch fetch address and the branch target address is less than or equal to a predetermined value.

To increase the achievable fetch bandwidth in the manner described above, it may be necessary to know the two target addresses corresponding to the two detected conditional branch instructions when the branch instructions are detected. It is advantageous to generate the target addresses when the branch instructions are detected in order to avoid costly and complex storage of target addresses generated in cycles prior to branch detection.

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes in an instruction cache (e.g. L1 I-cache 14 and/or L0 I-cache 16).

In one embodiment, processor 10 employs two bits of predecode information per instruction byte. One of the bits, referred to as the "start bit," indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and fetch or prefetch addresses for L1 I-cache 14. Instructions fetched from L0 I-cache 16 are scanned by fetch/scan unit 18 to identify instructions for dispatch, to locate branch instructions, to generate target address and to form branch predictions corresponding to the located branch instructions. Instruction scan information and corresponding instruction bytes are stored into instruction queue 20 by fetch/scan unit 18. Additionally, the identified branch instructions, the generated target addresses and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. One embodiment of the prefetch algorithm is set forth in more detail below.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries.

Alignment unit 22 is configured to route instructions identified by instruction queue 20 to a set of issue positions within lookahead/collapse unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Lookahead/collapse unit 24 decodes the instructions provided by alignment unit 22.

FPU/multimedia instructions detected by lookahead/collapse unit 24 are routed to FPU/multimedia unit 40. Other instructions are routed to first instruction window 30A, second instruction window 30B, and/or load/store unit 36. In one embodiment, a particular instruction is routed to the first instruction window 30A or second instruction window 30B based upon the issue position to which the instruction was aligned by alignment unit 22. According to one particular embodiment, instructions from alternate issue positions are routed to alternate instruction windows 30A and 30B. For example, instructions from issue positions zero, two, and four may be routed to the first instruction window 30A and instructions from issue positions one, three, and five may be routed to the second instruction window 30B. Instructions which include a memory operation are also routed to load/store unit 36 for access to L1 D-cache 38.

Additionally, lookahead/collapse unit 24 attempts to generate lookahead addresses or execution results for certain types of instructions. Lookahead address/result generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values.

To accelerate the execution of these instructions, lookahead/collapse unit 24 generates lookahead copies of the ESP and EBP registers for each of instructions decoded during a clock cycle. Additionally, lookahead/collapse unit 24 accesses future file 26 for register operands selected by each instruction. For each register operand, future file 26 may be storing either an execution result or a tag identifying a reorder buffer result queue entry corresponding to the most recent instruction having that register as a destination operand.

In one embodiment, lookahead/collapse unit 24 attempts to perform an address calculation for each instruction which: (i) includes a memory operand; and (ii) includes register operands used to form the address of the memory operand which are available from future file 26 or lookahead copies of ESP/EBP. Additionally, lookahead/collapse unit 24 attempts to perform a result calculation for each instruction which: (i) does not include a memory operand; (ii) specifies an add/subtract operation (including increment and decrement); and (iii) includes register operands which are available from future file 26 or lookahead copies of ESP/EBP. In this manner, many simple operations may be completed prior to instructions being sent to instruction windows 30A–30B.

Lookahead/collapse unit 24 detects dependencies between a group of instructions being dispatched and collapses any execution results generated therein into instructions dependent upon those instruction results. Additionally, lookahead/collapse unit 24 updates future file 26 with the lookahead execution results. Instruction operations which are completed by lookahead/collapse unit 24 are not dispatched to instruction windows 30A–30B.

Lookahead/collapse unit 24 allocates a result queue entry in reorder buffer/register file 28 for each instruction dispatched. In one particular embodiment, reorder buffer/register file 28 includes a result queue organized in a line-oriented fashion in which storage locations for execution results are allocated and deallocated in lines having enough storage for execution results corresponding to a maximum number of concurrently dispatchable instructions. If less than the maximum number of instructions are dispatched, then certain storage locations within the line are empty. Subsequently dispatched instructions use the next available line, leaving the certain storage locations empty. In one embodiment, the result queue includes 40 lines, each of which may store up to six execution results corresponding to concurrently dispatched instructions. Execution results are retired from the result queue in order into the register file included within reorder buffer/register file 28. Additionally, the reorder buffer handles branch mispredictions, transmitting the corrected fetch address generated by the execution of the branch instruction to fetch/scan unit 18. Similarly, instructions which generate other exceptions are handled within the reorder buffer. Results corresponding to instructions subsequent to the exception-generating instruction are discarded by the reorder buffer. The register file comprises a storage location for each architected register. For example, the x86 instruction set defines 8 architected registers. The register file for such an embodiment includes eight storage locations. The register file may further include storage locations used as temporary registers by a microcode unit in embodiments employing microcode units.

Future file 26 maintains the speculative state of each architected register as instructions are dispatched by lookahead/collapse unit 24. As an instruction having a register destination operand is decoded by lookahead/collapse unit 24, the tag identifying the storage location within the result queue portion of reorder buffer/register file 28 assigned to the instruction is stored into the future file 26 storage location corresponding to that register. When the corresponding execution result is provided, the execution result is stored into the corresponding storage location (assuming that a subsequent instruction which updates the register has not been dispatched).

It is noted that, in one embodiment, a group of up to six instructions is selected from instruction queue 20 and moves through the pipeline within lookahead/collapse unit 24 as a unit. If one or more instructions within the group generates a stall condition, the entire group stalls. An exception to this rule is if lookahead/collapse unit 24 generates a split line condition due to the number of ESP updates within the group. Such a group of instructions is referred to as a "line" of instructions herein.

Instruction windows 30 receive instructions from lookahead/collapse unit 24. Instruction windows 30 store the instructions until the operands corresponding to the instructions are received, and then select the instructions for execution. Once the address operands of an instruction including a memory operation have been received, the instruction is transmitted to one of the address generation units 34. Address generation units 34 generate an address from the address operands and forwards the address to load/store unit 36. On the other hand, once the execution operands of an instruction have been received, the instruction is transmitted to one of the functional units 32 for execution. In one embodiment, each integer window 30A–30B includes 25 storage locations for instructions. Each integer window 30A–30B is configured to select up to two address generations and two functional unit operations for execution each clock cycle in the address generation units 34 and functional units 32 connected thereto. In one embodiment, instructions fetched from L0 I-cache 16 remain in the order fetched until stored into one of instruction windows 30, at which point the instructions may be executed out of order.

In embodiments of processor 10 employing the x86 instruction set, an instruction may include implicit memory operations for load/store unit 36 as well as explicit functional operations for functional units 32. Instructions having no memory operand do not involve memory operations, and are handled by functional units 32. Instructions having a source memory operand and a register destination operand include an implicit load memory operation handled by load/store unit 36 and an explicit functional operation handled by functional units 32. Instructions having a memory source/destination operand include implicit load and store memory operations handled by load/store unit 36 and an explicit functional operation handled by functional units 32. Finally, instructions which do not have an explicit functional operation are handled by load/store unit 36. Each memory operation results in an address generation handled either by lookahead/collapse unit 24 or address generation units 34. Memory operations and instructions (i.e. functional operations) may be referred to herein separately, but may be sourced from a single instruction.

Address generation units 34 are configured to perform address generation operations, thereby generating addresses for memory operations in load/store unit 36. The generated addresses are forwarded to load/store unit 36 via result buses 48. Functional units 32 are configured to perform integer arithmetic/logical operations and execute branch instructions. Execution results are forwarded to future file 26, reorder buffer/register file 28, and instruction windows 30A–30B via result buses 48. Address generation units 34 and functional units 32 convey the result queue tag assigned to the instruction being executed upon result buses 48 to identify the instruction being executed. In this manner, future file 26, reorder buffer/register file 28, instruction windows 30A–30B, and load/store unit 36 may relate execution results with the corresponding instruction. FPU/multimedia unit 40 is configured to execute floating point and multimedia instructions.

Load/store unit 36 is configured to interface with L1 D-cache 38 to perform memory operations. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory. Load/store unit 36 may receive addresses for memory operations from lookahead/collapse unit 24 (via lookahead address calculation) or from address generation units 34. In one embodiment, load/store unit 36 is configured perform up to three memory operations per clock cycle to L1 D-cache 38. For this embodiment, load/store unit 36 may be configured to buffer up to 30 pload/store memory operations which have not yet accessed D-cache 38. The embodiment may further be configured to include a 96 entry miss buffer for buffering load memory operations which miss D-cache 38 and a 32 entry store data buffer. Load/store unit 36 is configured to perform memory dependency checking between load and store memory operations.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1

D-cache 38. Additionally, external interface unit 42 is configured to transfer cache lines discarded by L1 D-cache 38 to memory if the discarded cache lines have been modified by processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
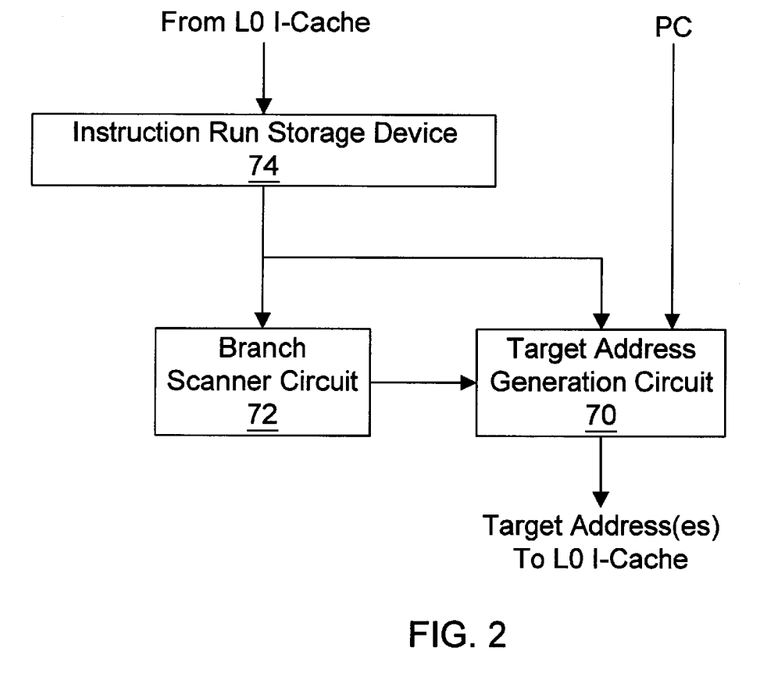
FIG. 2 is a block diagram of one embodiment of a fetch/scan unit shown in FIG. 1.
Figure 3:
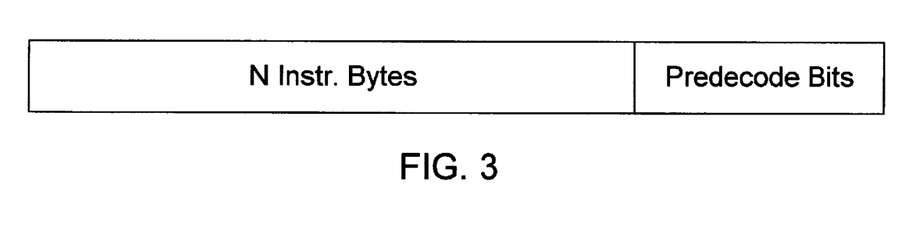
FIG. 3 illustrates the format of data stored within an instruction run storage device shown in FIG. 2.

Fetch/scan unit 18 operates to generate up to two target addresses in parallel in response to detection of up to a pair of conditional branch instructions within a fetched run of instructions. Turning now to FIG. 2, a block diagram of fetch/scan unit 18 that includes a target address generation circuit 70 for generating up to a pair of target addresses in parallel, is shown. In FIG. 2, the target address generation circuit 70 is coupled to a branch scanner circuit 72 and an instruction run storage device 74. The instruction run storage device 74 is configured to store a run of instructions fetched from L0 I-cache 16 or L1 I cache 14 of FIG. 1. In one embodiment, a run of instructions stored within instruction storage device 74 comprises N instruction bytes. FIG. 3 shows a format at which data is stored within instruction run storage device 74. As can be seen within FIG. 3, the N instruction bytes are stored along with predecode instruction bits associated therewith. The predecode bits, as noted above, are useful in identifying conditional branch instructions among the N bytes.

Branch scanner 72 is coupled to the instruction run storage device 74 and target address generation circuit 70. Likewise, target address generation circuit 70 is coupled to instruction run storage device 74 and is configured to receive N instruction bytes stored therein. Branch scanner circuit 72 is configured to scan the predecode bits stored within instruction run storage device 74 to detect up to two conditional branch instructions. More particularly, branch scanner circuit scanner 72 scans the predecode bits corresponding to the N bytes for corresponding start and control transfer bits both set to logical one. As noted above, these two bits when set to logical one, identify an opcode byte of a conditional branch instruction. Once a conditional branch opcode byte is detected, the branch scanner circuit 72 searches the start bits subsequent thereto for the next set start bit in order to identify the beginning of the next sequential instruction within the instruction storage run device 74. Once the next sequential instruction is found, branch scanner circuit generates a signal corresponding to the byte position within instruction storage device 74 corresponding to the last byte of the detected conditional branch instruction. It is noted the last byte of the conditional branch instruction corresponds to the displacement address of the branch target address.

As noted, branch scanner circuit 72 is configured to detect at least two conditional branch instructions. If a particular instruction run stored within instruction run storage device 74 contains a pair of conditional branch instructions, then branch scanner circuit 72 will issue signals to target address generation circuit 70 identifying run positions of corresponding address displacement bytes.

The target address generation circuit 70 is configured to generate at least first and second target addresses in response to the branch scanner circuit detecting at least two conditional branch instructions. The first and second target addresses may be generated in parallel and correspond, respectively, to target instructions to be executed if the first and second conditional branch instructions are predicted as taken. Target address generation circuit 70 generates the first and second target addresses as a function of the fetch address or program counter (PC) corresponding to the run of instructions stored within device 74 and the displacement address bytes.

Figure 4:
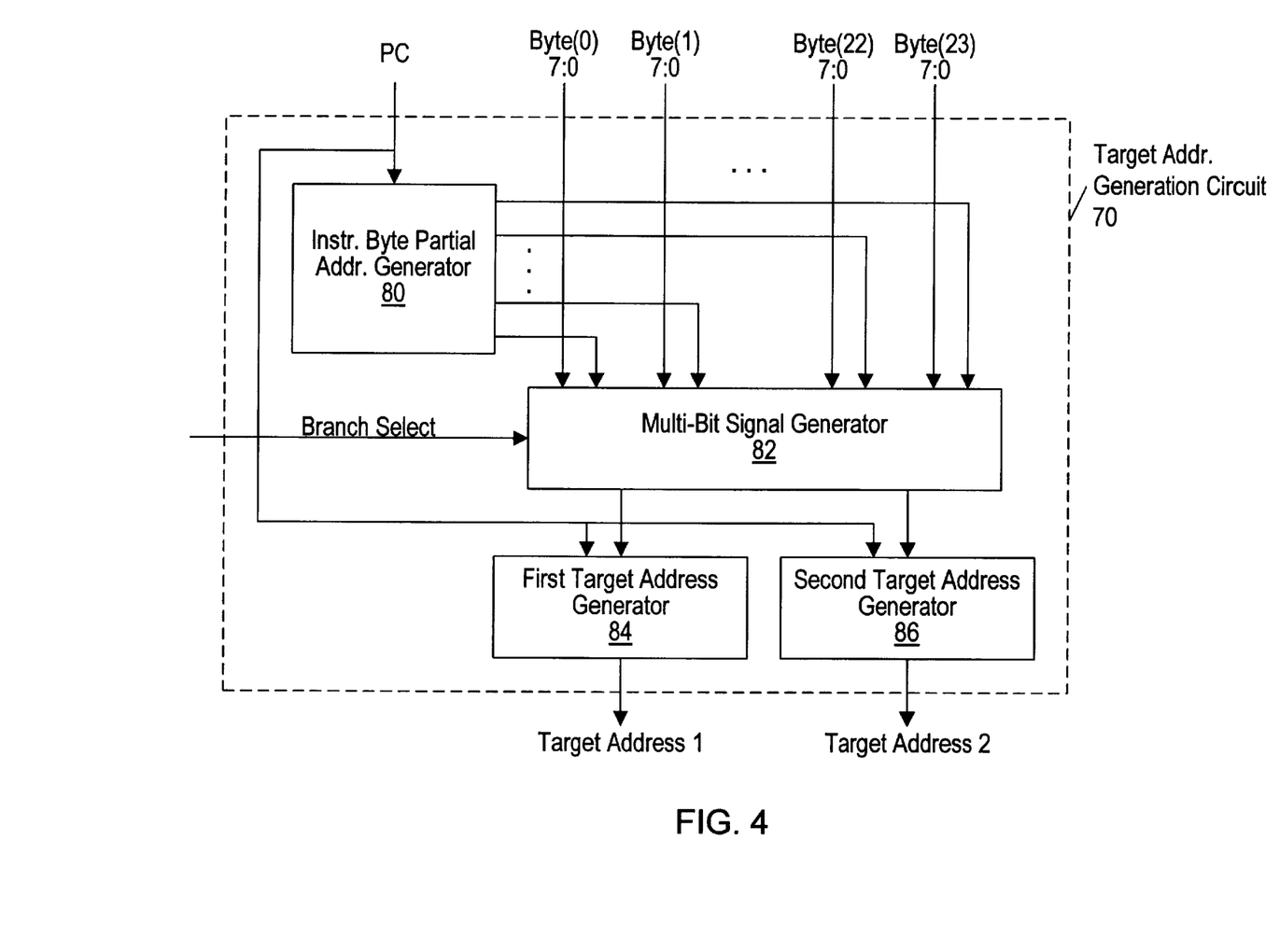
FIG. 4 is a block diagram of one embodiment of the target address generation circuit shown in FIG. 2.

FIG. 4 is a block diagram of one embodiment of the target address generation circuit 70 shown in FIG. 2. The target address generation circuit 70 shown in FIG. 4 includes an instruction byte partial address generator 80, a multi-bit signal generator 82, a first target address generator 84, and a second target address generator 86.

The multi-bit signal generator 82 is coupled to receive the N bytes of instructions (e.g., Byte$(x)_{7:0}$ wherein x defines the byte position within the instruction run storage device 74) from the instruction run storage device 74 (not shown in FIG. 4). The present invention will be explained with reference to multi-bit signal generator receiving N=24 bytes of instruction from instruction run storage device 74 shown in FIG. 2. However, the present invention should not be limited to any particular number of instruction bytes received by multi-bit signal generator 82.

Multi-bit signal generator 82 is also coupled to instruction byte partial address generator 80 and is configured to receive therefrom 24 instruction byte partial addresses (e.g., Addr$(x)_{7:0}$). Instruction byte partial address Addr$(x)_{7:0}$ defines the least significant bits of the fetch address associated with the $x^{th}$ instruction byte. The multi-bit signal generator 82 generates multi-bit signals as a function of the 24 instruction bytes and the 24 instruction byte partial addresses. Up to two multi-bit signals generated by the multi-bit signal generator 82 are selected for output to the first and second target address generators 84 and 86 in response to the multi-bit signal generator 82 receiving select signals from the branch scanner 72 shown in FIG. 2. The first and second target address generators, in turn, generate the first and second target addresses as a function of the selected multi-bit signals and the upper bits of the program counter of fetch address corresponding to the run of instructions stored within the instruction run storage device 74.

Figure 5:
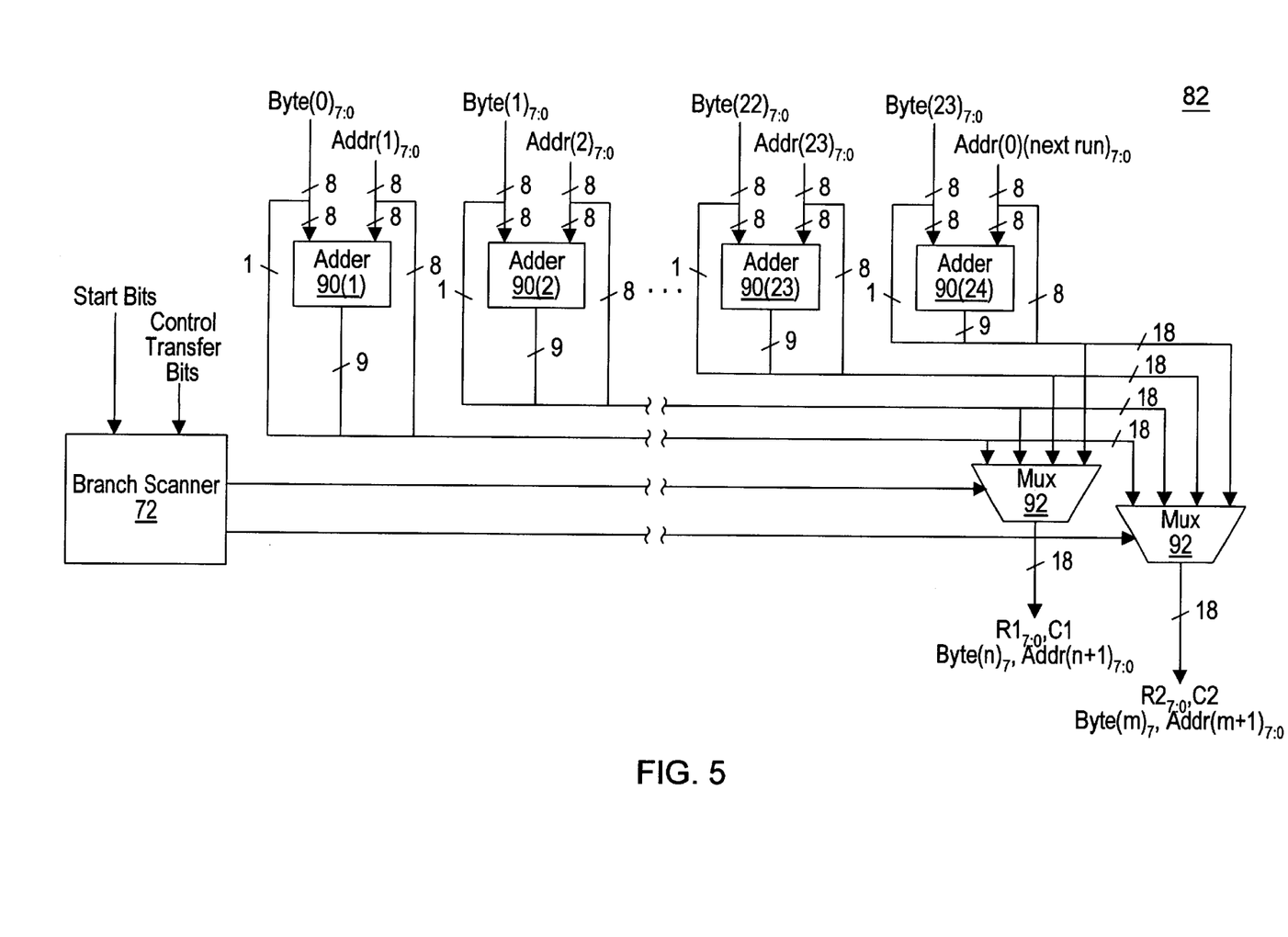
FIG. 5 is a block diagram of one embodiment of the multi-bit signal generator shown in FIG. 4.

FIG. 5 is a block diagram of one embodiment of the multi-bit signal generator 82 shown in FIG. 4. It is noted that within FIG. 5, the multi-bit signal generator 82 is coupled to branch scanner 72. Multi-bit signal generator 82 shown in FIG. 5 includes 24 adders 90(1)–90(24), a pair of selection circuits 92 and 94, respectively, defined in one embodiment as multiplexers. Each adder, 90(x) is configured to receive an instruction byte Byte$(x)_{7:0}$ from instruction run storage device 74 and an instruction byte partial address Addr$(x+1)_{7:0}$ from instruction byte partial address generator 80. It is noted that the last instruction byte partial address provided to adder 90(24) corresponds to the first instruction byte of the instruction run sequential in program order to the instruction run currently stored in the instruction run storage device 74. Each adder 90(x) adds the instruction byte and instruction byte partial address provided thereto in order to generate an 8-bit result and one-bit carry. Each result and carry combination of adders 90(1)–90(24) is provided to both multiplexers 92 and 94. Moreover, the most significant bit of each instruction byte and the instruction byte partial address provided to each adder is also provided to multiplexers 92 and 94. Thus, each multiplexer 92 and 94 receives 24 individual combinations each one consisting of an adder result, an adder carry, the most significant bit of an instruction byte provided to the adder, and an instruction byte partial address provided to the adder.

Branch scanner 72, as noted above, identifies the first and second conditional branch instructions stored within the instruction run storage device 74 and generates selection signals which are subsequently provided to multiplexers 92 and 94. The select signals correspond to the instruction run position of the target address displacement byte. Multiplexers 92 and 94 select first and second results and carries from the 24 results and carries generated by adders 90(1)–90(24). Additionally, multiplexers 92 and 94 select the most significant bits of the first and second instruction byte and the instruction byte partial addresses used in generating the first and second results and carries. The outputs of the multiplexers 92 and 94 are provided to the first and second target address generators 84 and 86, respectively. As will be more fully described below, first and second target address generators 84 and 86 generate the first and second target addresses corresponding to the detected first and second conditional branch instructions as a function of the first and second results.

Figure 6:
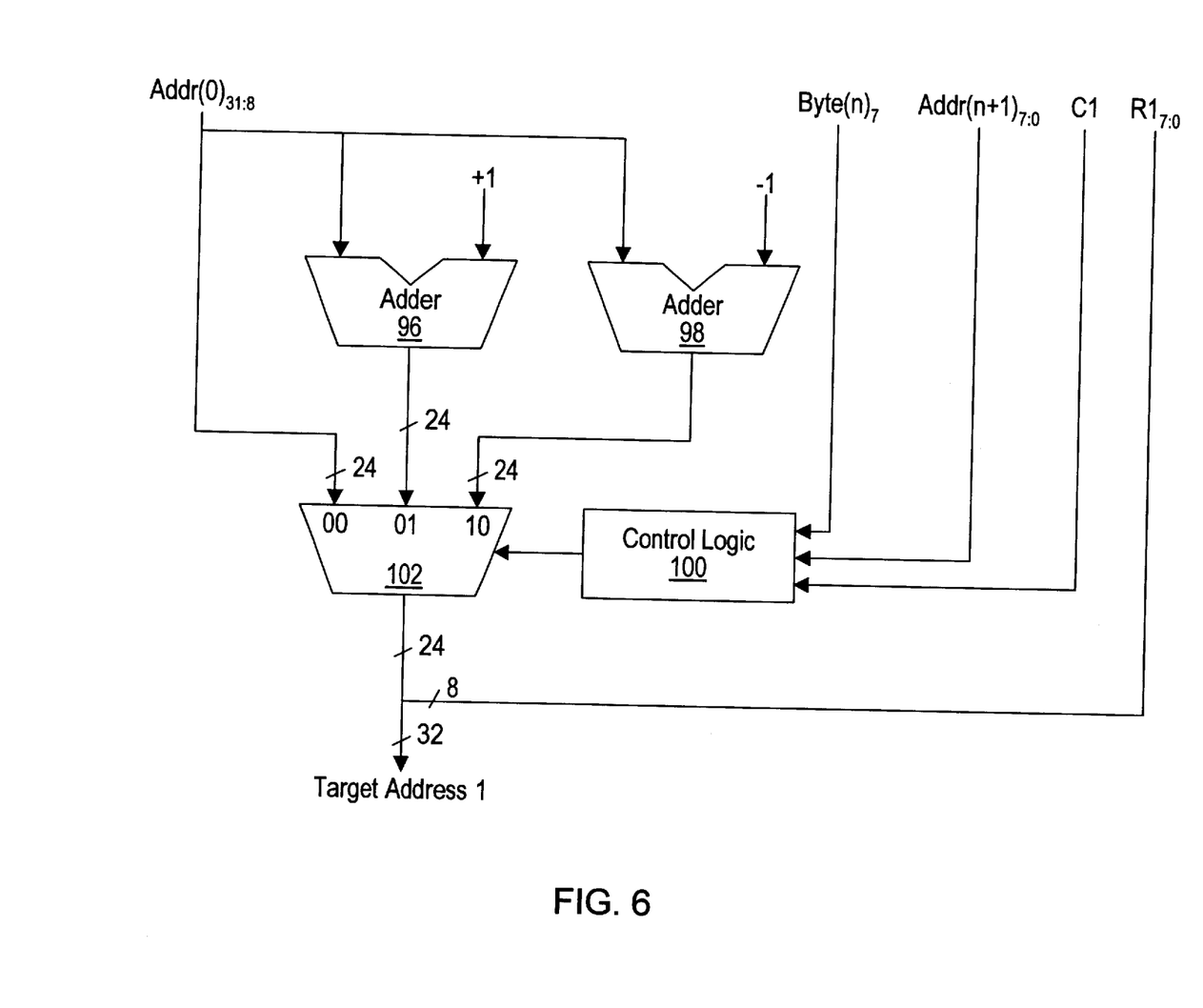
FIG. 6 is a block diagram of one embodiment of the first target address generator shown in FIG. 4.

FIG. 6 is a block diagram of one embodiment of the first target address generator 84 shown in FIG. 4. FIG. First target address generator 84 includes a pair of adders 96 and 98, control logic circuit 100, and selection device 102 defined in this embodiment to be a multiplexer. Adders 96 and 98 are configured to receive the upper bits of the program counter associated with the instruction run stored within instruction run storage device 74. Adder 96 is configured to increment the upper bits of this program counter by one while adder 98 is configured to decrement these upper bits by one. The results of adders 96 and 98 are provided to multiplexers 102. Additionally, multiplexer 102 receives the upper bits of the program counter.

Multiplexer 102 is configured to select one of the three inputs thereto for output based upon a selection signal generated by control logic 100. Control logic 100 generates the selection signal as a function of the most significant bit of the instruction byte selected by multiplexer 92, the instruction byte partial address selected by multiplexer 92, and the carry and result selected by multiplexer 92. Table 1 below shows the select signals generated by control logic 100 depending on the values inputted thereto.

TABLE 1

| $L(Addr(x)_{7:0})$ | C | $Byte(x)_7$ | $Addr(x+1)_7$ | Select |
|---|---|---|---|---|
| 0 | 0 | 0 | 0 | 00 |
| 0 | 0 | 1 | 0 | 10 |
| 0 | 0 | 0 | 1 | 00 |
| 0 | 0 | 1 | 1 | 00 |
| 0 | 1 | 0 | 0 | 00 |
| 0 | 1 | 1 | 0 | 00 |
| 0 | 1 | 0 | 1 | 01 |
| 0 | 1 | 1 | 1 | 00 |
| 1 | 0 | 0 | 0 | 00 |
| 1 | 0 | 1 | 0 | 10 |
| 1 | 0 | 0 | 1 | 01 |
| 1 | 0 | 1 | 1 | 00 |
| 1 | 1 | 0 | 0 | 00 |
| 1 | 1 | 1 | 0 | 00 |
| 1 | 1 | 0 | 1 | 01 |
| 1 | 1 | 1 | 1 | 01 |

In Table 1 $L(Addr(x)_{7:0})$ defines a logical AND operation of the instruction byte partial address. In other words, if all bits of the instruction bytes partial address equal logical one, the logical AND of the instruction byte partial address equals logical one. Conversely, if one or more bits of the instruction byte partial address equal logical zero, then the logical AND of the instruction byte partial address equals logical zero.

Table 1 shows the select signals generated by control logic 100 as a function of the values for logically Adding the instruction byte partial address, the carry bit, the most significant bit of the instruction byte, and the most significant bit of the instruction byte partial address. For example, if all these values are logical zero, then the control logic generates a select signal equal to "00" which in turn directs mulitplexer 102 to select for output the upper bits of the instruction run address. Table 1 also shows that if all of the values are logical one then the control logic will generate a select signal equal to "01" which directs multiplexer 102 to select for output therefrom, the results provided by adder 96. In either case, the output of multiplexer 102 is concatenated with the results selected by multiplexer 92, the result of which equates to the first target address.

Figure 7:
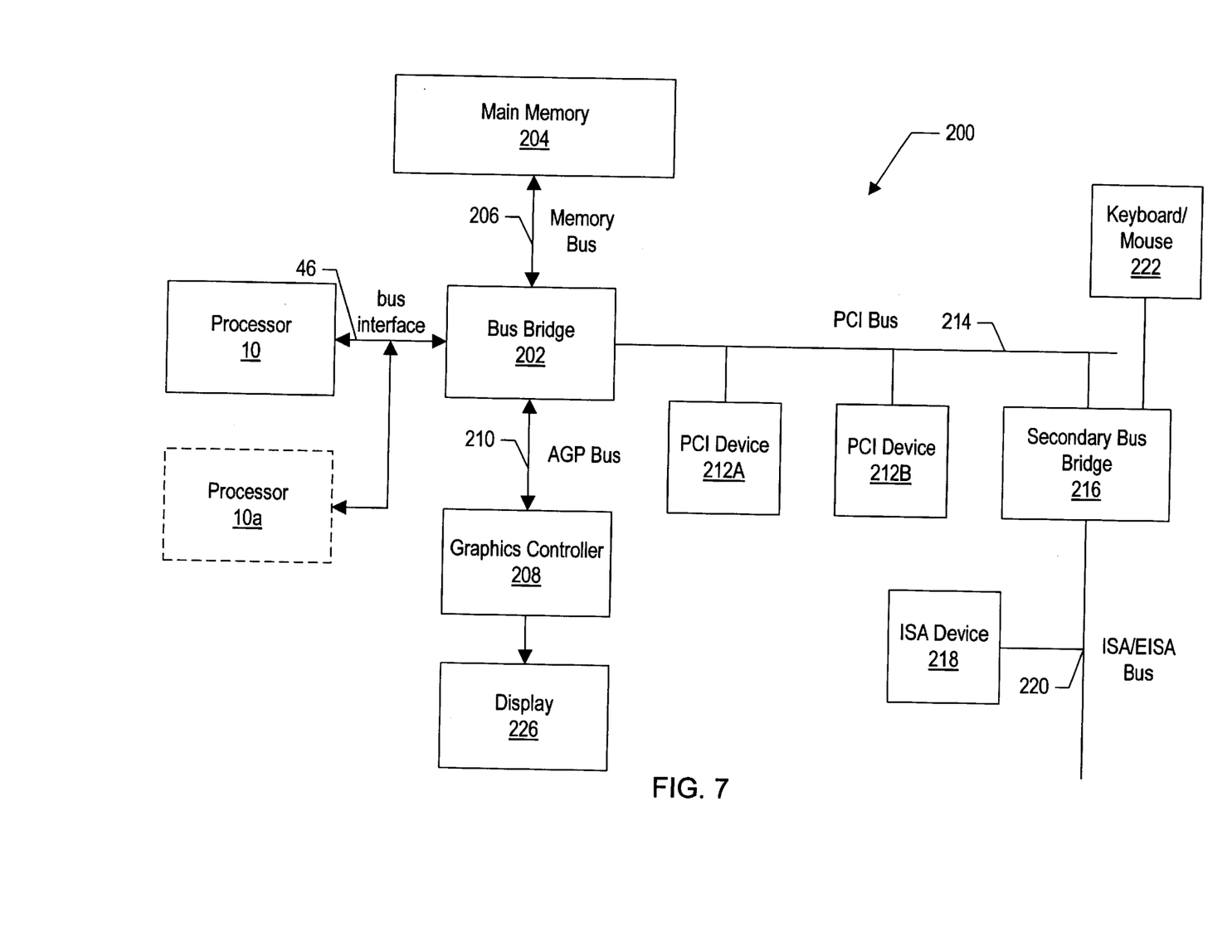
FIG. 7 is a block diagram of a computer system including the processor shown in FIG. 1.

Turning now to FIG. 7, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. FIG. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200).

Processor 10a may be similar to processor 10. More particularly, processor 10a may be an identical copy of processor 10. Processor 10a may share bus interface 46 with processor 10 (as shown in FIG. 13) or may be connected to bus bridge 202 via an independent bus.

In accordance with the above disclosure, a method for selectively invalidating and retaining instructions according to a forward branch target address of a branch instruction has been shown. Instead of discarding all instructions and fetching the branch target address, instructions which are not predicted to be executed are invalidated while other instructions are kept. Sequential fetching of the subsequent instructions may be performed. Fetch bandwidth may be increased due to the retaining of instructions already fetched from the branch target concurrent with the branch instruction and allowing sequential fetching of additional instructions to continue.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a storage device configured to store N instruction bytes;
   a branch scanner circuit coupled to the storage device, wherein the branch scanner circuit is configured to identify a first conditional branch instruction and a second conditional branch instruction, wherein the first and second branch instructions are contained within the N instruction bytes; and
   a target address generation circuit coupled to the branch scanner circuit, wherein the target address generation circuit is configured to generate a first target address and a second target address in response to the branch scanner circuit identifying the first and second conditional branch instructions, wherein the first and second target addresses are generated in parallel, and wherein the first and second target addresses correspond to first and second target instructions, respectively, to be executed if the first and second conditional branch instructions are predicted as taken; and wherein the target address generation circuit comprises:
   a multi-bit signal generator for generating multi-bit signals wherein the multi-bit signal generator is coupled to receive the N instruction bytes stored in the storage device, wherein each of the multi-bit signals is generated as a function of one of the N instruction bytes;
   a first target address generator coupled to the multi-bit signal generator for generating the first target address, and;
   a second target address generator coupled to the multi-bit signal generator for generating the second target address.

2. The microprocessor of claim 1 wherein the target address generation circuit further comprises an instruction byte partial address generator coupled to receive at least a portion of a fetch address corresponding to the N instruction bytes stored in the storage device, wherein the instruction byte partial address generator is configured to generate N instruction byte partial addresses corresponding to the N instruction bytes stored in the storage device, and wherein the N instruction partial byte addresses are generated by the partial instruction byte address generator as a function of the fetch address portion.

3. The microprocessor of claim 2 wherein the multi-bit signal generator comprises:
   N adders configured to generate N multi-bit signals by adding each of the N instruction bytes stored in the storage device and the instruction byte partial addresses;
   a first selection device having N inputs each of which is coupled to an output of one of the N adders, an output, and a selection input coupled to receive a first selection signal from the branch scanner circuit, wherein the first selection device is configured to select for output a first multi-bit signal in response to the first selection device receiving the first signal, and;
   a second selection device having N inputs each of which is coupled to the output of one of the N adders, an output, and a selection input coupled to receive a second selection signal from the branch scanner circuit, wherein the second selection device is configured to select for output a second multi-bit signal in response to the second selection device receiving the second selection signal.

4. The microprocessor of claim 3 wherein the first target address generator comprises:
   a first circuit coupled to receive upper bits of the fetch address, wherein the first circuit is configured to generate a first output as a function of the upper bits, wherein the first output represents the upper bits incremented by one;
   a second circuit coupled to receive the upper bits of the fetch address, wherein the second circuit is configured to generate a second output as a function of the upper bits, wherein the second output represents the upper bits decremented by one;
   a selection circuit with inputs coupled to receive the upper bits of the fetch address, the first output, and the second output, wherein the selection circuit is configured to select one of the upper bits of the fetch address, the first output and the second output in response to a selection signal;
   wherein the first target address is generated by concatenating the first multi-bit signal and the selected one of the upper bytes, the first output and the second output.

5. A computer system comprising:
a microprocessor comprising;
- a storage device configured to store N instruction bytes;
- a branch scanner circuit coupled to the storage device, wherein the branch scanner circuit is configured to identify a first conditional branch instruction and a second conditional branch instruction, wherein the first and second branch instructions are contained within the N instruction bytes; and
- a target address generation circuit coupled to the branch scanner circuit, wherein the target address generation circuit is configured to generate a first target address and a second target address in response to the branch scanner circuit identifying the first and second conditional branch instructions, wherein the first and second target addresses are generated in parallel, and wherein the first and second target addresses correspond to first and second target instructions, respectively, to be executed if the first and second conditional branch instructions are predicted as taken; and wherein the target address generation circuit comprises:
    - a multi-bit signal generator for generating multi-bit signals wherein the multi-bit signal generator is coupled to receive the N instruction bytes stored in the storage device, wherein each of the multi-bit signals is generated as a function of one of the N instruction bytes;
    - a first target address generator coupled to the multi-bit signal generator for generating the first target address, and;
    - a second target address generator coupled to the multi-bit signal generator for generating the second target address; and
- a peripheral device coupled to the microprocessor, wherein said peripheral device is configured to communicate between the computer system and another computer system.

6. The computer system of claim 5 further comprising a second microprocessor.

7. The computer system of claim 5 further comprising an instruction byte partial address generator coupled to receive a fetch address corresponding to the N instruction bytes stored in the storage device, wherein the instruction byte partial address generator is configured to generate N instruction byte partial addresses corresponding to the N instruction bytes stored in the storage device, and wherein the N instruction partial byte addresses are generated by the partial instruction byte address generator as a function of the fetch address.

8. The computer system of claim 7 wherein the multi-bit signal generator comprises:
- N adders configured to generate N multi-bit signals by adding each of the N instruction bytes stored in the storage device and the instruction byte partial addresses;
- a first selection device having N inputs each of which is coupled to an output of one of the N adders, an output, and a selection input coupled to receive a first selection signal from the branch scanner circuit, wherein the first selection device is configured to select and output a first multi-bit signal in response to the first selection device receiving the first signal, and;
- a second selection device having N inputs each of which is coupled to the output of one of the N adders, an output, and a selection input coupled to receive a second selection signal from the branch scanner circuit, wherein the second selection device is configured to select and output a second multi-bit signal in response to the second selection device receiving the second signal.

9. The computer system of claim 8 wherein the first target address generator comprises:
- a first circuit coupled to receive upper bits of the fetch address, wherein the first circuit is configured to generate a first output as a function of the upper bits, wherein the first output represents the upper bits incremented by one;
- a second circuit coupled to receive the upper bits of the fetch address, wherein the second circuit is configured to generate a second output as a function of the upper bits, wherein the second output represents the upper its decremented by one;
- a selection circuit inputs coupled to receive the upper bits of the fetch address, the first output, and the second output, wherein the selection circuit is configured to select one of the upper bytes, the first output and the second output in response to a selection signal;
- wherein the first target address is generated by concatenating the first multi-bit signal and the selected one of the upper bytes, the first output and the second output.

10. A method generating first and second target instruction addresses comprising:
- identifying a first conditional branch instruction, wherein the first conditional branch instruction is contained within a plurality of instruction bytes;
- identifying a second conditional branch instruction, wherein the second conditional branch instruction is contained within the plurality of instruction bytes;
- generating a first target address in response to identifying the first conditional branch instruction, wherein first target address corresponds to a first target instruction to be executed if the first conditional branch instruction is predicted as taken;
- generating a second target address in response to identifying the second conditional branch instruction, wherein second target address corresponds to a second target instruction to be executed if the second conditional branch instruction is predicted as taken;
- wherein the first and second target addresses are generated in parallel;
- generating an instruction byte partial address for each of the bytes in the plurality of instruction bytes, wherein each instruction byte partial address is generated as a function of a fetch address of the plurality of instruction bytes;
- adding instruction byte partial addresses and corresponding bytes of the plurality of instruction bytes to generate N multi-bit signals;
- selecting a first multi-bit signal and a second multi-bit signal from the N multi-bit signals;
- wherein the first target address is generated as a function of the first multi-bit signal, and;
- wherein the second target address is generated as a function of the second multi-bit signal.

11. The method of claim 10 further comprising:
- generating predecode bits for each byte of the plurality of instruction bytes, wherein the predecode bits are encoded to identify conditional branch instructions;
- wherein identifying the first conditional branch instruction comprises scanning the generated predecode bits for first predecode bits identifying the first conditional branch instruction, and;

wherein identifying the second conditional branch instruction comprises scanning the generated predecode bits for second predecode bits identifying the second conditional branch instruction.

12. The method of claim 10 further comprising:

generating a first selection signal in response to identifying the first conditional branch instruction, wherein the first multi-bit signal is selected in response to generating the first selection signal, and;

generating a second selection signal in response to identifying the second conditional branch instruction, wherein the second multi-bit signal is selected in response to generating the second selection signal.

13. The method of claim 10 wherein the N multi-bit signals are generated in parallel, and wherein the first and second multi-bit signals are selected in parallel.

14. The method of claim 10 further comprising:

incrementing upper bits of the fetch address to generate an incremented value;

decrementing the upper bits of the fetch address to generate a decremented value;

wherein generating the first target address comprises selecting one of the upper bits of the fetch address, the incremented value, and the decremented value, and concatenating the selected one of the upper bits of the fetch address, the incremented value, and the decremented value with the first multi-bit signal.

15. The method of claim 11 wherein generating the first target instruction address comprises adding a displacement byte of the identified first conditional branch instruction and an address of the first conditional branch instruction.

16. An apparatus coupled to receive N instruction bytes and at least a portion of N corresponding addresses, the apparatus comprising:

N adders, each of the N adders configured to unconditionally add one of the N instruction bytes and a corresponding one of the portion of the N corresponding addresses;

a selection device coupled to the N adders, the selection device configured to select an output of one of the N adders in response to a selection control; and a branch scanner configured to locate a first branch instruction in the N instruction bytes and to provide the selection control in response to locating the first branch instruction.

17. The apparatus as recited in claim 16 wherein a first one of the N corresponding addresses, which corresponds to a first one of the N instruction bytes, identifies a byte which is sequential to the first one of the N instruction bytes.

18. The apparatus as recited in claim 16 further comprising a second selection device coupled to the N adders, the second selection device configured to select an output of a second one of the N adders in response to a second selection control, and wherein the branch scanner is configured to locate a second branch instruction in the N instruction bytes and to provide the second selection control in response to located the second branch instruction.

19. The apparatus as recited in claim 16 wherein the branch scanner is coupled to receive predecode data corresponding to the N instruction bytes, and wherein the branch scanner is configured to scan the predecode data to locate the first branch instruction.

20. The apparatus as recited in claim 16 wherein the portion of each of the N corresponding addresses is a byte.

21. The apparatus as recited in claim 20 wherein the output of each of the N adders includes a one byte sum and a carry.

22. The apparatus as recited in claim 21 wherein the selection device is further coupled to receive the most significant bit of each of the N instruction bytes, and wherein the selection device is configured to select the most significant bit of one of the N instruction bytes responsive to the selection control.

23. The apparatus as recited in claim 16 further comprising at least one target address generator coupled to the selection device, the target address generator configured to generate a target address of the first branch instruction.

24. A method comprising:

unconditionally adding N instruction bytes and at least a portion of N corresponding addresses to produce N values;

locating a first branch instruction in the N instruction bytes; and selecting one of the N values in response to locating the first branch instruction.

25. The method as recited in claim 24 wherein a first one of the N corresponding addresses, which corresponds to a first one of the N instruction bytes, identifies a byte which is sequential to the first one of the N instruction bytes.

26. The method as recited in claim 24 further comprising:

locating a second branch instruction in the N instruction bytes; and selecting a second one of the N values responsive to locating the second branch instruction.

27. The method as recited in claim 24 wherein the locating comprises scanning predecode data corresponding to the N instruction bytes.

28. The method as recited in claim 24 wherein the portion of each of the N corresponding addresses is a byte.

29. The method as recited in claim 28 wherein each of the N values includes a one byte sum and a carry.

30. The method as recited in claim 29 wherein each of the N values further includes a most significant bit of a corresponding one of the N instruction bytes.

\* \* \* \* \*